(12) United States Patent
Tanaka

(10) Patent No.: US 7,154,537 B2
(45) Date of Patent: Dec. 26, 2006

(54) CAMERA SYSTEM, CONTROL METHOD THEREOF, DEVICE MANUFACTURING APPARATUS, EXPOSURE APPARATUS, AND DEVICE MANUFACTURING METHOD

(75) Inventor: Hiroshi Tanaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 10/330,099

(22) Filed: Dec. 30, 2002

(65) Prior Publication Data

US 2003/0128277 A1    Jul. 10, 2003

(30) Foreign Application Priority Data

Jan. 8, 2002    (JP)    ............... 2002-001601

(51) Int. Cl.
- H04N 5/232 (2006.01)
- H04N 7/18 (2006.01)
- H04N 9/47 (2006.01)
- G01B 11/00 (2006.01)
- H01L 21/76 (2006.01)

(52) U.S. Cl. ............... 348/211.11; 356/399; 356/400; 348/87; 438/400

(58) Field of Classification Search ............ 348/211.9, 348/211.11, 211.5, 521, 525, 526, 47, 48, 348/87, 125–126; 355/53; 438/400; 356/400, 356/399

See application file for complete search history.

(56) References Cited

U.S. PATENT DOCUMENTS

| | | | | |
|---|---|---|---|---|
| 4,926,258 A | * | 5/1990 | Sasaki et al. ............... | 348/72 |
| 5,249,016 A | | 9/1993 | Tanaka ............... | 355/53 |
| 5,815,594 A | * | 9/1998 | Tanaka ............... | 382/151 |
| 5,923,990 A | * | 7/1999 | Miura ............... | 438/401 |
| 6,288,742 B1 | * | 9/2001 | Ansari et al. ............... | 348/211.14 |
| 6,639,626 B1 | * | 10/2003 | Kubo et al. ............... | 348/218.1 |
| 6,788,390 B1 | * | 9/2004 | Tanaka ............... | 355/68 |
| 6,795,124 B1 | * | 9/2004 | Gamo et al. ............... | 348/525 |
| 2002/0036777 A1 | | 3/2002 | Tanaka ............... | 356/401 |
| 2002/0154283 A1 | | 10/2002 | Tanaka et al. ............... | 355/53 |

* cited by examiner

*Primary Examiner*—Ngoc-Yen Vu
*Assistant Examiner*—Gregory Madden
(74) *Attorney, Agent, or Firm*—Fitzpatrick, Cella, Harper & Scinto

(57) ABSTRACT

An exposure apparatus for exposing a substrate to a pattern. The apparatus includes a stage configured to hold the substrate and to move, a driving unit configured to drive the stage, a plurality of cameras, each of the plurality of cameras being configured to sense an image of a mark for alignment of the substrate, the plurality of cameras including at least two cameras of which specifications are different from each other, a camera controller configured to supply a sync signal common to the plurality of cameras, to cause the plurality of cameras to execute image sensing based on the common sync signal, and to measure position of the mark based on the sensed image, and a drive controller configured to control the driving unit based on information provided by the camera controller. The common sync signal includes a common horizontal sync signal having a first horizontal period. One of the at least two cameras includes an image sensing element having a specification in which the image sensing element operates in accordance with a horizontal sync signal having a second horizontal period, and the one camera drives the image sensing element in accordance with the common horizontal sync signal by using, as one horizontal period, at least a common multiple of the first and second horizontal periods.

2 Claims, 8 Drawing Sheets

CAMERA SYSTEM, CONTROL METHOD THEREOF, DEVICE MANUFACTURING APPARATUS, EXPOSURE APPARATUS, AND DEVICE MANUFACTURING METHOD

FIELD OF THE INVENTION

The present invention relates to a camera system preferably assembled into a device manufacturing apparatus, such as an exposure apparatus, a control method thereof, a device manufacturing apparatus and an exposure apparatus into which the camera system is assembled, and a device manufacturing method using the exposure apparatus.

BACKGROUND OF THE INVENTION

Various methods have been proposed and practiced for positioning (also to be referred to as "alignment" hereinafter) between a master, such as a reticle, and a substrate, such as a wafer, in an exposure apparatus. Alignment in the exposure apparatus will be briefly explained with reference to FIG. 6.

Positioning a reticle R with respect to a projection lens UL is called reticle alignment. Reticle alignment is performed by, e.g., driving a reticle stage RS so as to correct a shift between a reticle mark (not shown) on the reticle R and a reference mark RR on the reticle stage RS. More specifically, the reticle mark and the reticle R held on the reticle stage RS and the reference mark RR, which is formed on the reticle stage RS and has a known reference position, are sensed by a camera (C1) 201. The sensed images are processed by an image processor 305 in a camera controller 300 to measure the relative shift amount. A drive control device (SF) 121 drives a reticle driving device (MOT1) 123 so as to correct the measured relative shift amount. Note that the reference mark may exist on a wafer stage WS.

Measuring the positional relationship between a wafer WAF held on the wafer stage WS and a reference position is called wafer alignment. Actual alignment is done by driving the wafer stage WS prior to exposure of each shot on the basis of the measurement result. More specifically, in wafer alignment, the position of an alignment mark (not shown) on the wafer WAF chucked by the wafer stage WS is sensed by a camera (C3) 203 via an off-axis microscope OAS outside the projection lens UL. The sensed image is processed by the image processor 305 of the camera controller 300 to measure the mark position. By measuring the positions of a plurality of marks on the wafer WAF, the position of the wafer WAF on the wafer stage WS and the position of an exposed shot on the wafer WAF can be measured. Note that the microscope may be of a TTL or TTR type, in which a wafer mark is observed via the projection lens UL.

Measuring the relative positions of the reticle stage RS, which holds the reticle R and the wafer stage WS, which holds the wafer WAF, is called calibration. More specifically, in calibration, light emitted by a light source (not shown) irradiates a reference mark WR on the wafer stage WS via a reticle reference mark RSM and a projection lens UL. Light containing image information of the reference mark WR passes through the projection lens UL and reticle stage reference mark RSM again and reaches a camera (C2) 202. An image formed on the image sensing plane of the camera (C2) 202 is a synthesized image of the reference mark WR on the wafer stage WS and the reticle reference mark RSM. The image processor 305 processes the synthesized image of WR and RSM to calculate the relative horizontal distance between reference mark WR and reference mark RSM, thereby measuring the relative positional relationship between the reticle stage RS and the wafer stage WS.

If the positional relationship between RR and RSM is known, the positional relationship between the reticle and the wafer is determined by the above measurement, and a pattern on the reticle can be accurately transferred to the wafer.

In this manner, recent semiconductor exposure apparatuses execute various measurements, and the camera used in measurement changes depending on the measurement application. Recently, the exposure performance demanded of the semiconductor exposure apparatus is a line width of 100 nm or less. The measurement precision required for the above-mentioned alignment and position measurement becomes very high.

In order to increase the measurement precision, the microscope magnification may be increased. However, an increase in magnification is restricted, and the measurement precision must be increased even with a large relative shift in calibration measurement, or the like. That is, the camera used in calibration measurement, or the like, must have a wide detection range and high precision. To meet this demand, the range of one image sensing operation must be widened, and a high-pixel-density camera (CCD camera, or the like) must be adopted.

A semiconductor manufacturing apparatus performs measurement using various cameras, as described above, and a camera appropriate for each application must be selected. Cameras must be properly used such that a high-resolution camera with one million to two million pixels is used as the calibration measurement camera (C2) 202, and the standard cameras C1 and C3 with four hundred thousand pixels are used as reticle and wafer alignment cameras. All the cameras may be high-resolution cameras, which is not preferable in consideration of the cost, image transfer time, and the like.

Baseline measurement is an example of installing a camera having a plurality of image sensing areas in a semiconductor exposure apparatus and executing various measurements at a high speed.

In baseline measurement, the relative positions of the reticle stage RS, wafer stage WS, and off-axis microscope OAS are measured. More specifically, baseline measurement can be achieved by the following flow.

<STEP 1>
A camera selector (SEL) 301 of the camera controller 300 is switched to the camera (C2) 202, and the relative horizontal distance between RSM and WR is measured.

<STEP 2>
The camera selector (SEL) 301 of the camera controller 300 is switched to the camera (C3) 203. The wafer stage WS is moved so as to position WR below the off-axis microscope OAS. The WR position is sensed by the camera (C3) 203, and measured based on the sensed image.

<STEP 3>
The positional relationship between RS and the off-axis microscope OAS is determined on the basis of the WR position measured using the camera (C3) 203 and the RSM and WR positions measured using the camera (C2) 202.

<STEP 4>
STEP 1 to STEP 3 are repetitively executed, in order to increase the measurement precision.

As described above, baseline measurement repetitively executes measurement using the camera (C2) 202 and camera (C3) 203. In baseline measurement, the exposure apparatus does not perform any exposure, and a long measurement time decreases the productivity of the exposure apparatus. Hence, baseline measurement must be processed at a high speed.

A problem when the number of pixels (specification) is different between the camera (C2) 202 and the camera (C3) 203 will be explained. FIG. 5A shows the sync signal of the standard camera (C3) 203 with four hundred thousand pixels, and FIG. 5B shows the sync signal of the high-resolution (nonstandard) camera (C2) 202 with two million pixels. Each of sync signals VD and HD supplied to the two cameras is different between the cameras. In baseline measurement, simultaneously when the standard camera (C3) 203 is switched to the nonstandard camera (C2) 202, the output pattern of a sync signal generator (SYNC) 303 must be switched to a pattern for the camera (C2) 202. Simultaneously, when the nonstandard camera (C2) 202 is switched to the standard camera (C3) 203, the output pattern of the sync signal generator (SYNC) 303 must be switched to a pattern for the camera (C3) 203.

In general, a CCD camera often used as the above-described camera cannot obtain a stable video signal during several frames upon a change in sync signal frequency. This problem arises from the presence of a delay in a circuit for detecting the phase of an externally supplied sync signal, resetting the internal operation of the camera, and outputting a video signal.

Switching between the camera (C2) 202 and the camera (C3) 203 cannot be done simultaneously, and requires a non-negligible time. As a result, the camera switching time influences the measurement flow in baseline measurement, prolonging the baseline measurement time.

As a method of solving this problem, (1) a camera controller having a function of generating two types of sync signals is mounted;

(2) camera controllers equal in number to camera types are mounted; and (3) instead of supplying a sync signal from an external camera controller and driving each camera, a sync signal is generated in each camera, and the sync signal supplied from the camera is separated by the image processor.

Method (1) is relatively simple, but is a special function. To cope with a larger number of different cameras, the sync signal generator becomes complicated, changing the cost and scale of the camera controller.

Method (2) requires camera controllers equal in number to camera types, and increases the cost and mounting space. Since the camera (C2) 202 and camera (C3) 203 are not simultaneously used, only either one of the cameras is wastefully operated by a plurality of camera controllers. In other words, each camera controller is less valuable.

In method (3), the sync separation circuit of the image processor must wait until phase detection, or the like, stabilizes every time the camera speed changes. The same problem as that generated in the camera side also occurs.

SUMMARY OF THE INVENTION

The present invention has been made to overcome the conventional drawbacks, and has as its main object to shorten, e.g., the switching time between cameras having different specifications.

It is the secondary object of the present invention to control a plurality of cameras by one camera controller having a simple arrangement.

According to the first aspect of the present invention, there is provided a camera system comprising a plurality of cameras, and a controller, which supplies a sync signal common to the plurality of cameras and causes the plurality of cameras to execute image sensing on the basis of the common sync signal. The plurality of cameras includes at least two cameras having different specifications.

At least two cameras may be different in the number of pixels, or may be different in at least one of horizontal and vertical sync periods.

According to a preferred aspect of the present invention, it is preferably that the common sync signal include a common vertical sync signal having a first vertical period, one of at least two cameras includes an image sensing element having a specification in which the image sensing element operates in accordance with a vertical sync signal having a second vertical period longer than the first vertical period, and one camera drives the image sensing element in accordance with the common vertical sync signal by using, as one vertical period, a period which is longer than the second vertical period and is an integer multiple of the first vertical period.

According to another preferred aspect of the present invention, it is preferable that the common sync signal include a common horizontal sync signal having a first horizontal period, one of at least two cameras includes an image sensing element having a specification in which the image sensing element operates in accordance with a horizontal sync signal having a second horizontal period, and one camera drives the image sensing element in accordance with the common horizontal sync signal by using, as one horizontal period, a least common multiple of the first and second horizontal periods.

According to still another preferred aspect of the present invention, it is preferable that the common sync signal include a common vertical sync signal having a first vertical period and a common horizontal sync signal having a first horizontal period, one of at least two cameras includes an image sensing element having a specification in which the image sensing element operates in accordance with a vertical sync signal having a second vertical period longer than the first vertical period and a horizontal sync signal having a second horizontal period, and one camera drives the image sensing element in accordance with the common vertical and horizontal sync signals by using, as one vertical period, a period which is longer than the second vertical period and is an integer multiple of the first vertical period and using, as one horizontal period, a least common multiple of the first and second horizontal periods.

According to still another preferred aspect of the present invention, the camera controller preferably comprises an image processor which processes image signals sent from the plurality of cameras.

According to the second aspect of the present invention, there is provided a method of controlling a camera system having a plurality of cameras and a camera controller, which controls the plurality of cameras, comprising the control step of supplying a sync signal common to the plurality of cameras from the camera controller and causing the plurality of cameras to execute image sensing on the basis of the common sync signal. The plurality of cameras includes at least two cameras having different specifications.

According to the third aspect of the present invention, there is provided a device manufacturing apparatus comprising the camera system, and an operating unit, which operates on the basis of information provided by a controller of the camera system.

According to the fourth aspect of the present invention, there is provided an exposure apparatus comprising the camera system, a stage (e.g., a reticle stage or the wafer stage), and a driving unit, which drives the stage on the basis of information provided by a controller of the camera system.

According to the fifth aspect of the present invention, there is provided a device manufacturing method comprising the steps of applying a photosensitive agent to a substrate, transferring a pattern onto the photosensitive agent by using the exposure apparatus, and developing the photosensitive agent.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below with reference to the accompanying drawings.

First Embodiment

A camera system as a preferred embodiment of the present invention will be explained with reference to FIGS. 2 to 5B.

Figures 5A, 5B, 5C:
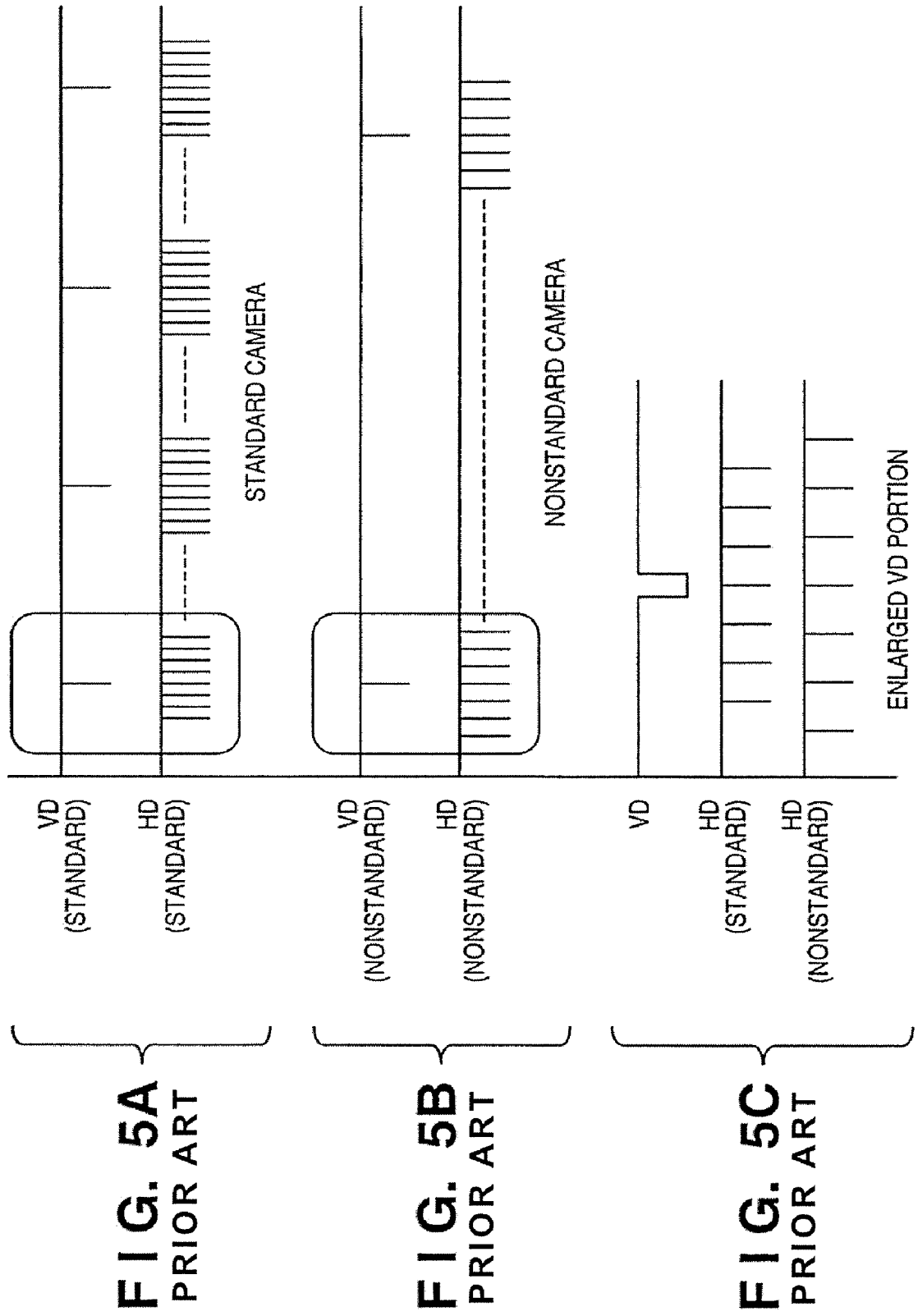
FIGS. 5A to 5C are charts showing conventional sync signals for standard and nonstandard cameras, respectively.
Figure 6:
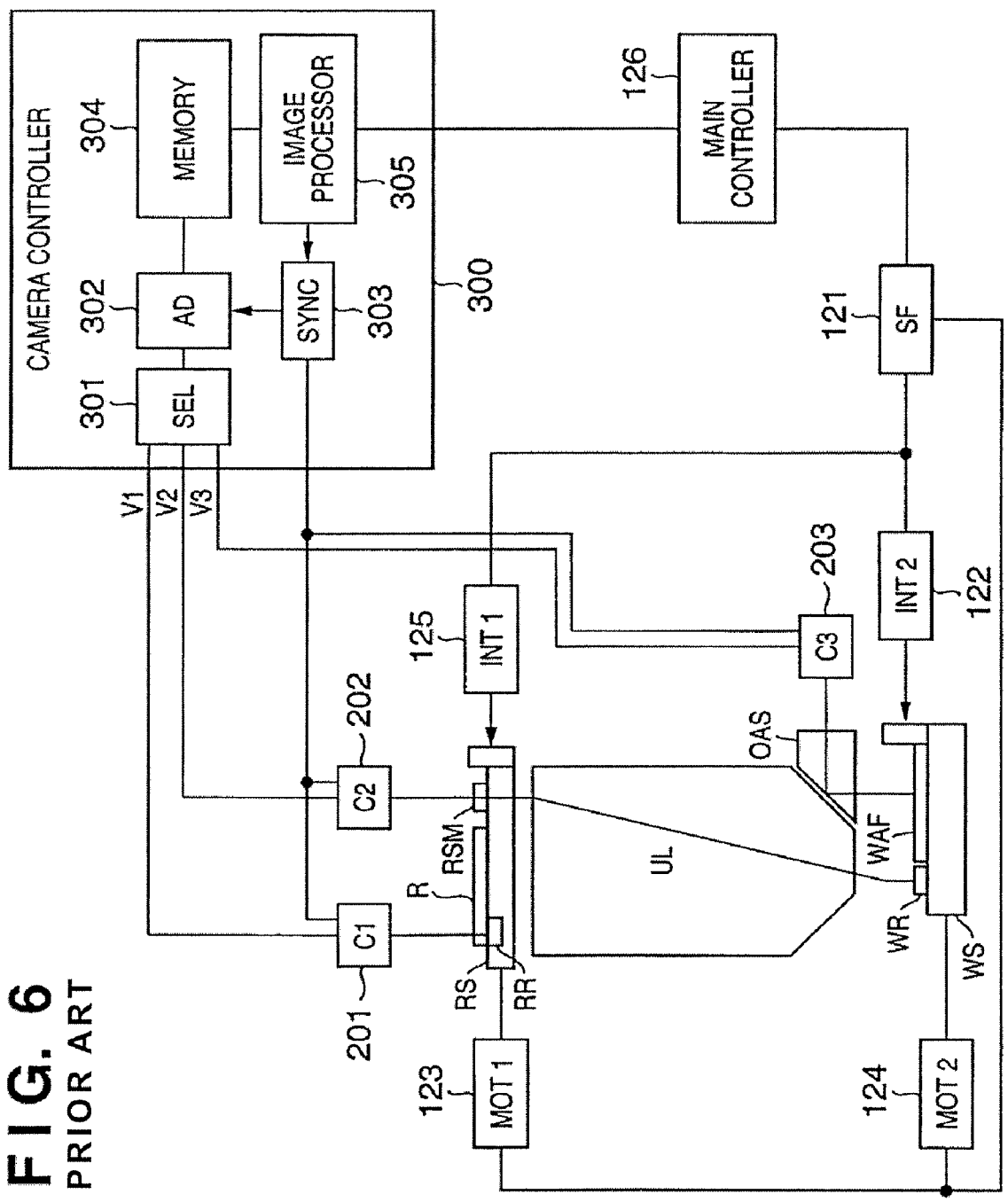
FIG. 6 is a view showing the arrangement of a conventional exposure apparatus.

The camera system will be described by exemplifying a case wherein a vertical sync signal VD of a nonstandard camera has 2.8 fields close to about 3 fields (cycles) of a vertical sync signal VD of a standard camera, and the cycle of a horizontal sync signal HD of the nonstandard camera is almost 3/2 the cycle of a horizontal sync signal HD of the standard camera, as shown in FIG. 5B.

In general, the vertical sync signal VD is a signal which defines a period necessary to transfer an image of one field or one frame, and a sync signal for segmenting the field or frame. In general, the horizontal sync signal HD is a signal which segments a period necessary to output an image of one scanning line.

The camera system of the first embodiment uses vertical and horizontal sync signals common to a plurality of cameras.

The common vertical sync signal VD is implemented by monitoring the vertical sync signal VD (common vertical sync signal) for the standard camera and improving a VD sync circuit in the nonstandard camera so as to output an image of one field using three fields defined by the vertical sync signal VD. The nonstandard camera outputs an image of one field in 2.8 fields defined by the vertical sync signal VD for the standard camera. In the remaining 0.2 field out of three fields, the nonstandard camera is inhibited from outputting an image.

The common horizontal sync signal HD is implemented by resetting a counter in the nonstandard camera to zero in accordance with the vertical sync signal VD for the standard camera, counting horizontal syn signals HD for the standard camera by the counter, and outputting an image of two HD periods in three HD periods (three horizontal sync periods). In this example, the horizontal and vertical sync signals HD and VD generated in the nonstandard camera are shown in FIG. 2B.

The above example is generalized as follows.

The common vertical sync signal VD is generalized as follows.

Let VDtnstd be one period of the vertical sync signal VD for the nonstandard camera, VDtstd be one period of the vertical sync signal VD (i.e., common vertical sync signal in this example) for the standard camera, and VDtnstd' be the vertical sync period in the nonstandard camera when a vertical sync signal supplied from the camera controller to each camera is commonly used. In this case, the common vertical sync signal VD is given by For $VDtnstd \leq VDtstd$, $VDtnstd' = VDtstd$ For $VDtnstd > VDtstd$, $$VDtnstd' = [\text{int}(VDtnstd/VDtstd)+1] \times VDtstd \quad (1)$$

where int( ) is a calculation of dropping the decimal point.

Equation (1) means that the vertical sync period in a nonstandard camera higher in speed than the standard camera complies with the vertical sync signal VD for the standard camera, and that the vertical sync period in a nonstandard camera lower in speed than the standard camera is an integer multiple of a vertical sync period complying with the vertical sync signal VD for the standard camera.

The common horizontal sync signal is generalized as follows.

Let HDtnstd be one period of the horizontal sync signal HD for the nonstandard camera, HDtstd be one period of the horizontal sync signal HD (i.e., common horizontal sync signal in this example) for the standard camera, and HDtnstd' be the horizontal sync period in the nonstandard camera when a horizontal sync signal supplied from the camera controller to each camera is commonly used. In this case, the counter of the nonstandard camera is reset at a timing at which HDtnstd' becomes the least common multiple of HDtnstd and HDtstd.

For example, for HDtnstd=150 μsec and HDtstd=100 μsec, the counter of the nonstandard camera is so reset as to adjust HDtnstd' to their least common multiple of 300 μsec.

The arrangement and operation of a camera and camera controller in the camera system according to the first embodiment of the present invention will be described with reference to FIG. 3.

This camera system comprises a camera controller 100, standard camera (C1) 201, nonstandard camera (C2) 202, and standard camera (C3) 203. An exposure apparatus as a semiconductor manufacturing apparatus which incorporates the camera system will be explained as the second embodiment.

The camera controller 100 will be described.

A vertical sync period VDtnstd' in operating the nonstandard camera (C2) 202 is determined in accordance with equation (1), and set in a Y address counter 104 by an image processor 109. The image processor 109 has an image processing function and a function of controlling each portion in the camera controller 100.

Let s be the ratio VDtnstd'/VDtstd of VDtnstd' to VDtstd. The ratio s is set in a vertical sync signal counter (VD counter) 102 by the image processor 109. Upon s-time reception of standard vertical sync signals VD generated by a sync signal generator (SYNC) 103, the vertical sync counter 102 resets the Y address counter 104, and at the same time resets a horizontal sync signal counter (HD counter) 101 and X address counter 106. "Reset" means to return the image input to the origin.

In operating the nonstandard camera (C2) 202, HDnstd for the nonstandard camera is set in the X address counter 106 by the image processor 109. Let n be the ratio (HDtnstd'/HDtstd) of HDtnstd' to HDtstd. The ratio n is set in the HD counter 101 by the image processor 109. Upon n-time reception of standard horizontal sync signals HD generated by the sync signal generator (SYNC) 103, the HD counter 101 resets the X address counter 106.

Figure 4:
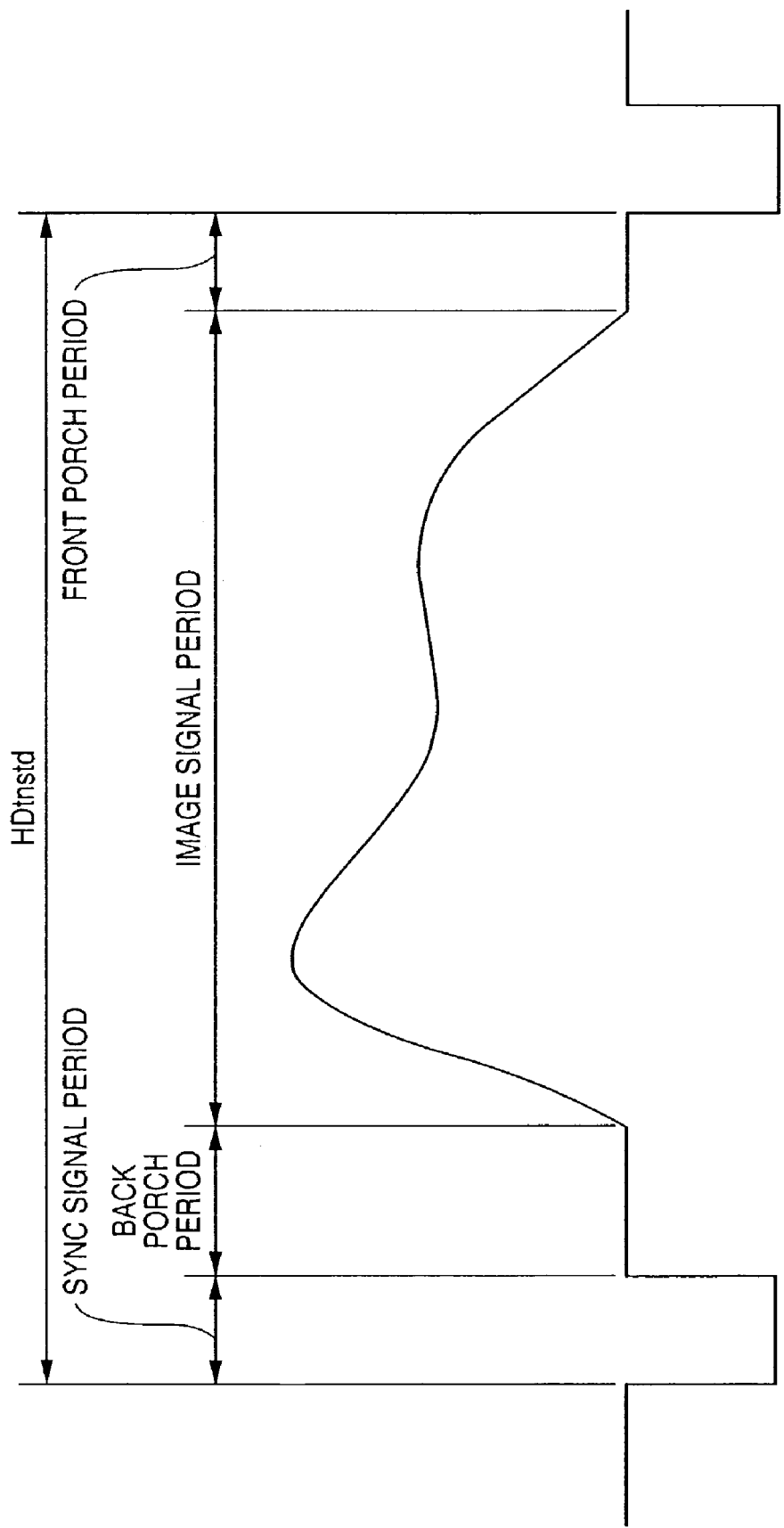
FIG. 4 is a graph showing the waveform of one horizontal period.

As shown in FIG. 4, the period HDtnstd contains a sync signal period, back porch signal period, image signal period, and front porch signal period, which depend on the camera specifications.

The X address counter 106 counts pixel clocks (fundamental clocks) which are generated by a pixel clock generator 105 as sync signals used to A/D-convert a signal from each pixel. The X address counter 106 stores, in a memory 107, image data A/D-converted only while image signals are input. After counting pixel clocks during the period HDtnstd, the X address counter is reset by itself and increments the Y address counter 104. This operation is repeated, and image data obtained by A/D-converting image signals are stored in the memory 107.

The camera (C2) 202 also operates by the same principle. The camera (C2) 202 receives the vertical sync signal VD and horizontal sync signal HD (for the standard camera in this embodiment) common to the cameras C1 to C3 from the external camera controller 100.

In operating the camera (C2) 202, the same values as those set in corresponding counters of the camera controller 100 are set in a horizontal sync signal counter (HD counter) 211, vertical sync signal counter (VD counter) 212, and X address counter 215 of the camera (C2) 202. This setting may be done in advance in, e.g., shipping a camera system, or at an arbitrary timing after shipping (e.g., in changing horizontal and vertical sync signals generated by the camera controller 100). As shown in FIG. 4, a sync signal, back porch signal, image signal, and front porch signal are output to the X address counter 215 during the period HDtnstd.

The X address counter 215 and a Y address counter 213 drive an image sensing element (e.g., CCD) 216 by their output signals. An output signal (image signal) from the image sensing element 216 is supplied to a camera selector 110 of the camera controller 100.

In this fashion, the camera system according to the first embodiment of the present invention operates the nonstandard camera to read an image by using the horizontal and vertical sync signals HD and VD for the standard camera.

In operating the standard camera, the image processor 109 sets s, n, and HDtnstd for the standard camera, and parameters representing the sync signal period, back porch period, image signal period, and front porch period.

According to the first embodiment, s, n, HDtnstd, and parameters representing the sync signal period, back porch period, image signal period, and front porch period are set by the camera controller in accordance with any camera to be operated. As a result, an image can be captured in response to a reference sync signal generated by the camera controller.

An image can also be captured by the camera controller from the camera by only setting HDtnstd without setting n on the camera side and camera controller side. In this case, the frequency of the pixel clock of the camera side must completely coincide with each other. If the frequencies do not completely coincide with each other, e.g., a shift of a fraction of one pixel occurs upon the lapse of every HDtnstd, and the start position of each scanning line shifts. In this case, an image stored in the memory 107 shifts in the X direction as the Y address increases. To prevent this, it is preferable to set n to be as small as possible and to reset the X address counters 106 and 215 within a short cycle. A large n may generate jitter.

Second Embodiment

Figure 1:
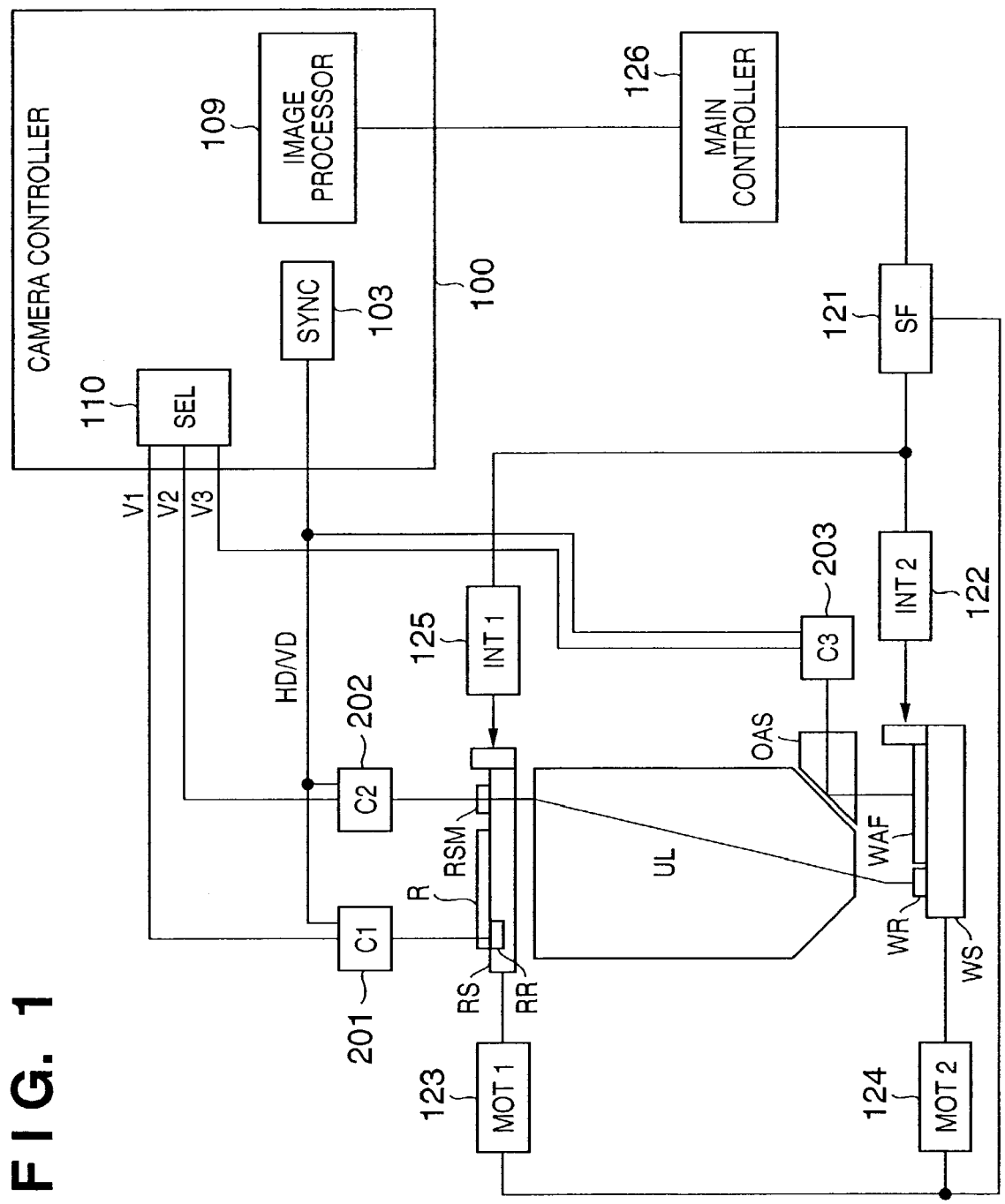
FIG. 1 is a view showing the arrangement of an exposure apparatus according to a preferred embodiment of the present invention.
Figure 2:
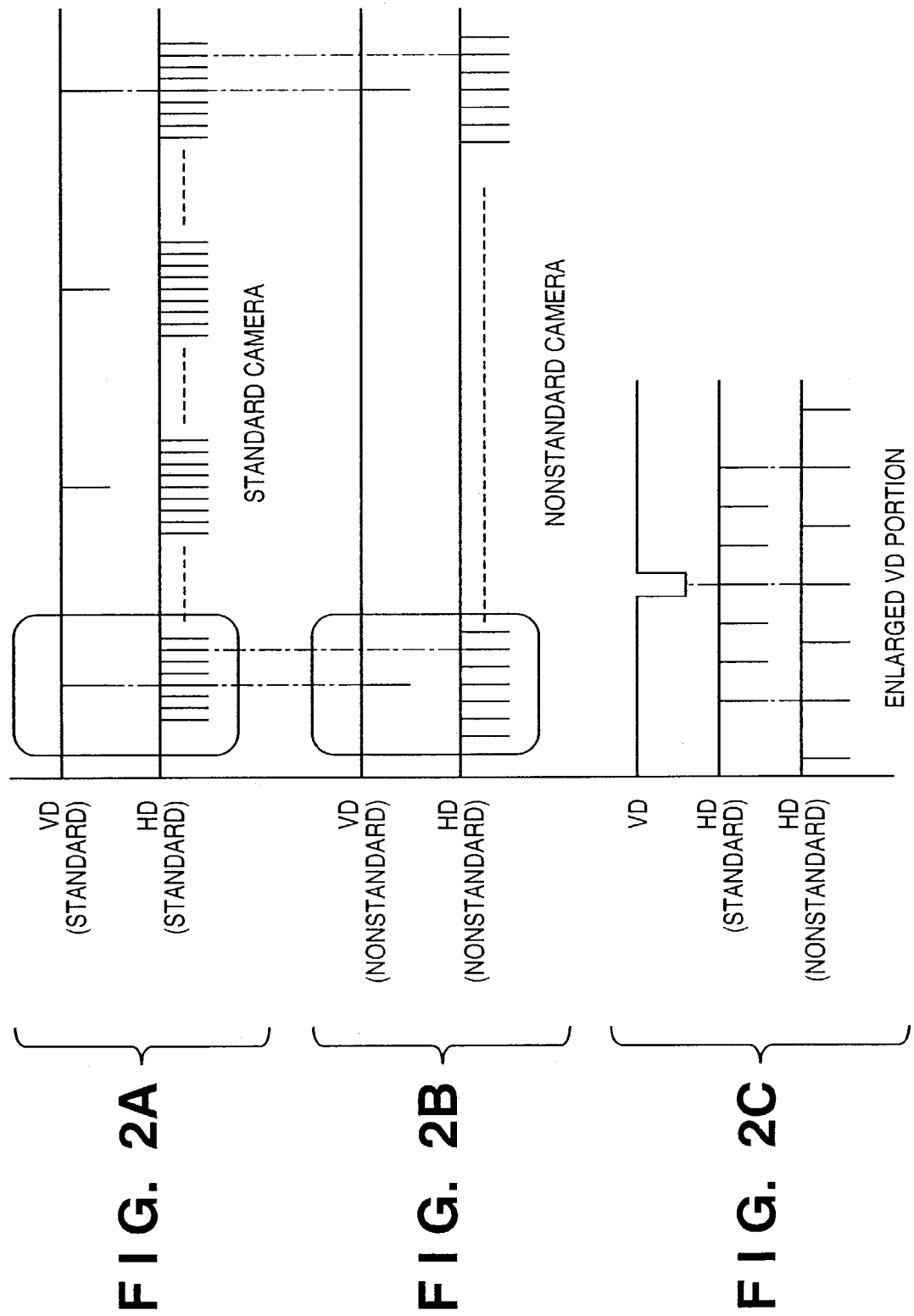
FIGS. 2A, 2B, and 2C are charts showing a sync signal for a standard camera, a sync signal generated in a nonstandard camera, and a vertical sync signal VD, respectively.

The second embodiment concerns an exposure apparatus as a semiconductor manufacturing apparatus into which the camera system described as the first embodiment is assembled. The exposure apparatus as the second embodiment of the present invention will be explained with reference to FIG. 1. The camera system described as the first embodiment, which comprises a camera controller 100 and cameras (C1 to C3) 201 to 203, is assembled into the exposure apparatus. In FIG. 1, some arrangements in the camera controller 100 are not illustrated owing to illustrative limitations.

In this exposure apparatus, horizontal and vertical sync signals HD and VD generated by a sync signal generator (SYNC) 103 of the camera controller 100 are commonly supplied to the cameras (C1 to C3) 201 to 203.

Assume that the cameras C1 and C3 are standard cameras and the camera C2 is a nonstandard camera, similar to the above-described example.

To measure a reference mark WR on a wafer stage WS by a microscope OAS, an image processor 109 sets a camera selector (SEL) 110 to V3, i.e., the camera (C3) 203.

In the use of the camera (C3) 203, the image processor 109 in the camera controller 100 sets n=1, s=1, and HDtnstd=HDtstd. Further, the image processor 109 sets the sync signal period, back porch period, image signal period, and front porch period to those for the standard camera. The sync signal generator (SYNC) 103 outputs horizontal and vertical sync signals HD and VD common to the standard and nonstandard cameras.

A stage driving device (SF) 121 drives a driving device (MOT2) 124, such as a motor, and while checking the value of an interferometer (INT2) 122, drives the wafer stage WS to the target position, i.e., the position of the reference mark WR to be observed via the microscope OAS.

Figure 3:
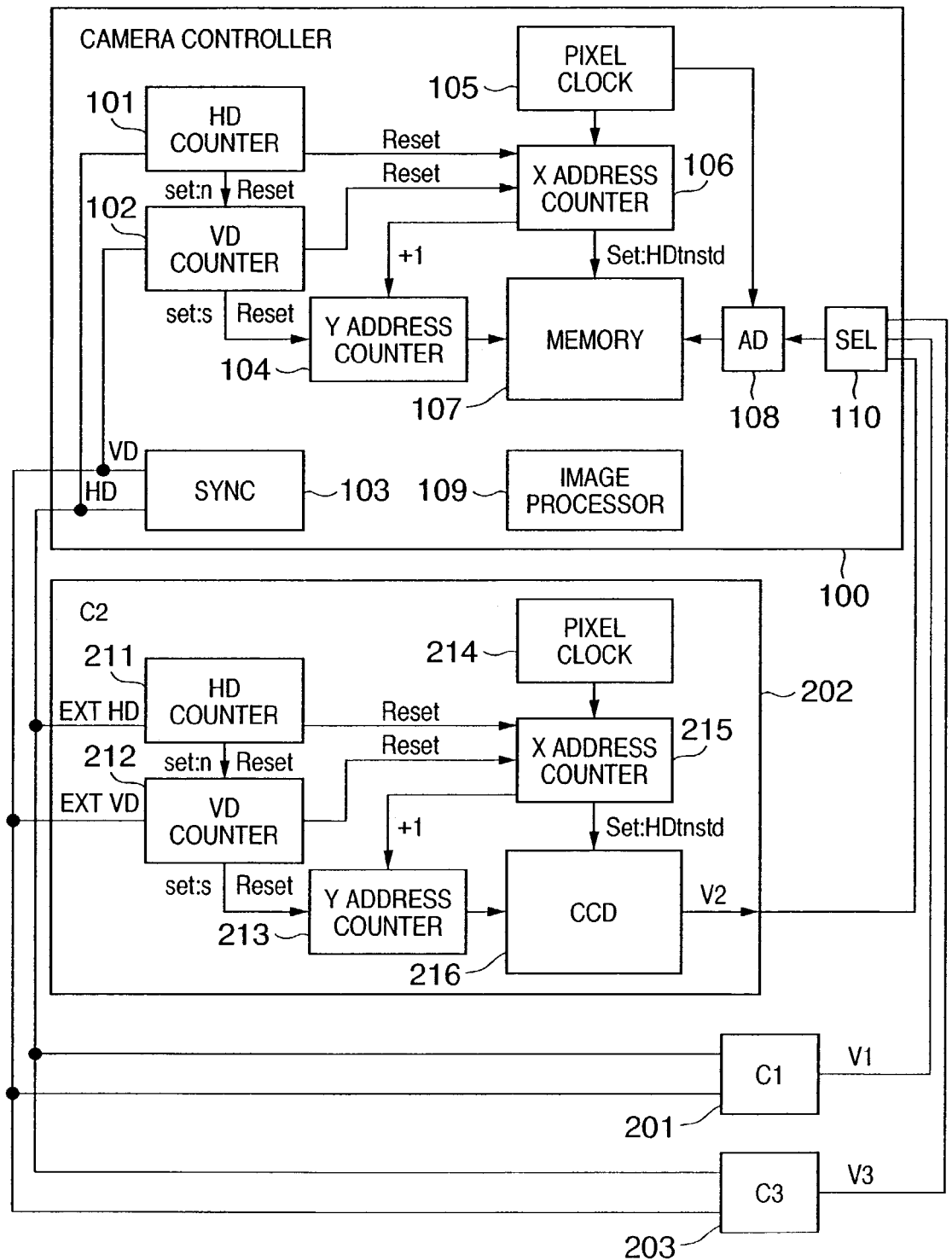
FIG. 3 is a block diagram showing the arrangement of a camera system according to another preferred embodiment of the present invention.

After the wafer stage WS reaches the target position, the image processor 109 controls each portion in the camera controller 100 so as to receive an image signal obtained by the camera (C3) 203 and to store it in a memory 107 (see FIG. 3). The image processor 109 processes the received image to calculate the position of the reference mark WR on the wafer stage WS.

Operation of measuring RMS and WR by the camera (C2) 202 will be explained. The image processor 109 sets the camera selector 110 to V2, i.e., the camera (C2) 202.

In the use of the camera (C2) 202, the image processor 109 in the camera controller 100 sets n, s, HDtnstd, and a sync signal period, back porch period, image signal period, and front porch period for the nonstandard camera. Note that setting of n and s has been described in the first embodiment.

The sync signal generator (SYNC) 103 keeps outputting horizontal and vertical sync signals HD and VD for the standard camera (i.e., common horizontal and vertical sync signals). The camera (C2) 202 keeps operating by the horizontal and vertical sync signals HD and VD for the standard camera.

The stage driving device (SF 121) drives the driving device (MOT2) 124, such as a motor, and while checking the value of the interferometer (INT2) 122, drives the wafer stage WS until the position of the reference mark WR coincides with the optical axis of the camera (C2) 202. At the same time, the stage driving device (SF) 121 drives a driving device (MOT1), such as a motor, and while checking the value of an interferometer (INT1) 125, drives the reticle stage RS until the position of a reference mark RSM coincides with the optical axis of the camera (C2) 202.

After the wafer stage WS and reference mark RSM reach the target positions, the image processor 109 controls each portion in the camera controller 100 so as to receive an image signal obtained by the camera (C2) 202 and to store it in the memory 107 (see FIG. 3). The image processor 109 processes the received image to calculate the positions of the reference marks WR and RSM.

The image processor 109 then calculates the baseline on the basis of the WR and RMS positions measured using the camera (C2) 202 and the WR position measured using the camera (C3) 203.

(Device Manufacturing Method)

Figure 7:
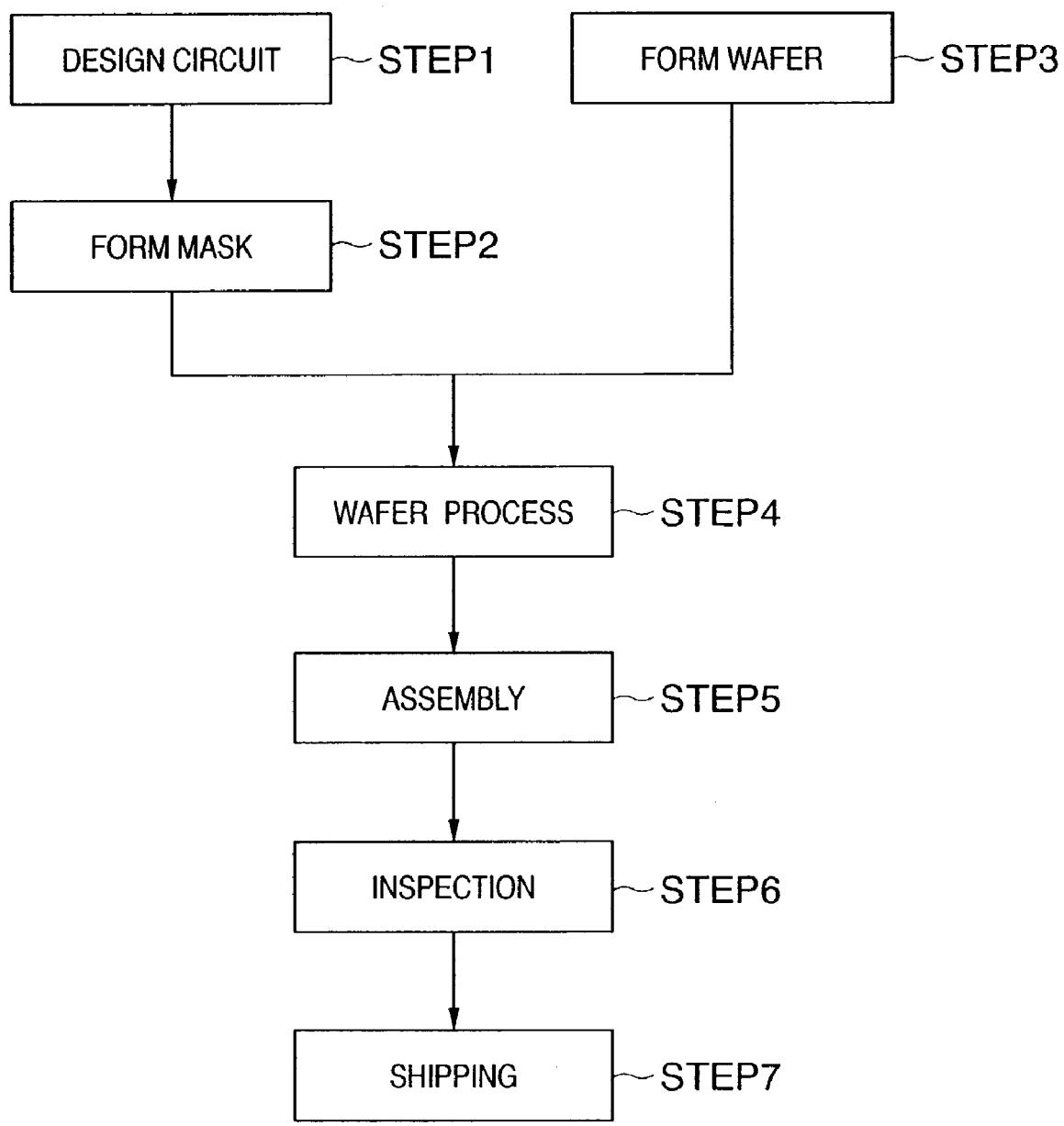
FIG. 7 is a flow chart showing the flow of the whole manufacturing process of a semiconductor device.

A semiconductor device manufacturing process using the above-described apparatus will be explained. FIG. 7 is a flow chart showing the flow of the whole manufacturing process of a semiconductor device. In step 1 (circuit design), a semiconductor device circuit is designed. In step 2 (mask formation), a mask is formed based on the designed circuit pattern. In step 3 (wafer formation), a wafer is formed using a material such as silicon. In step 4 (wafer process), called a pre-process, an actual circuit is formed on the wafer by lithography using the mask and wafer. Step 5 (assembly), called a post-process, is the step of forming a semiconductor chip by using the wafer formed in step 4, and includes an assembly process (dicing and bonding) and a packaging process (chip encapsulation). In step 6 (inspection), the semiconductor device manufactured in step 5 undergoes inspections, such as an operation confirmation test and a durability test. After these steps, the semiconductor device is completed and shipped (step 7).

Figure 8:
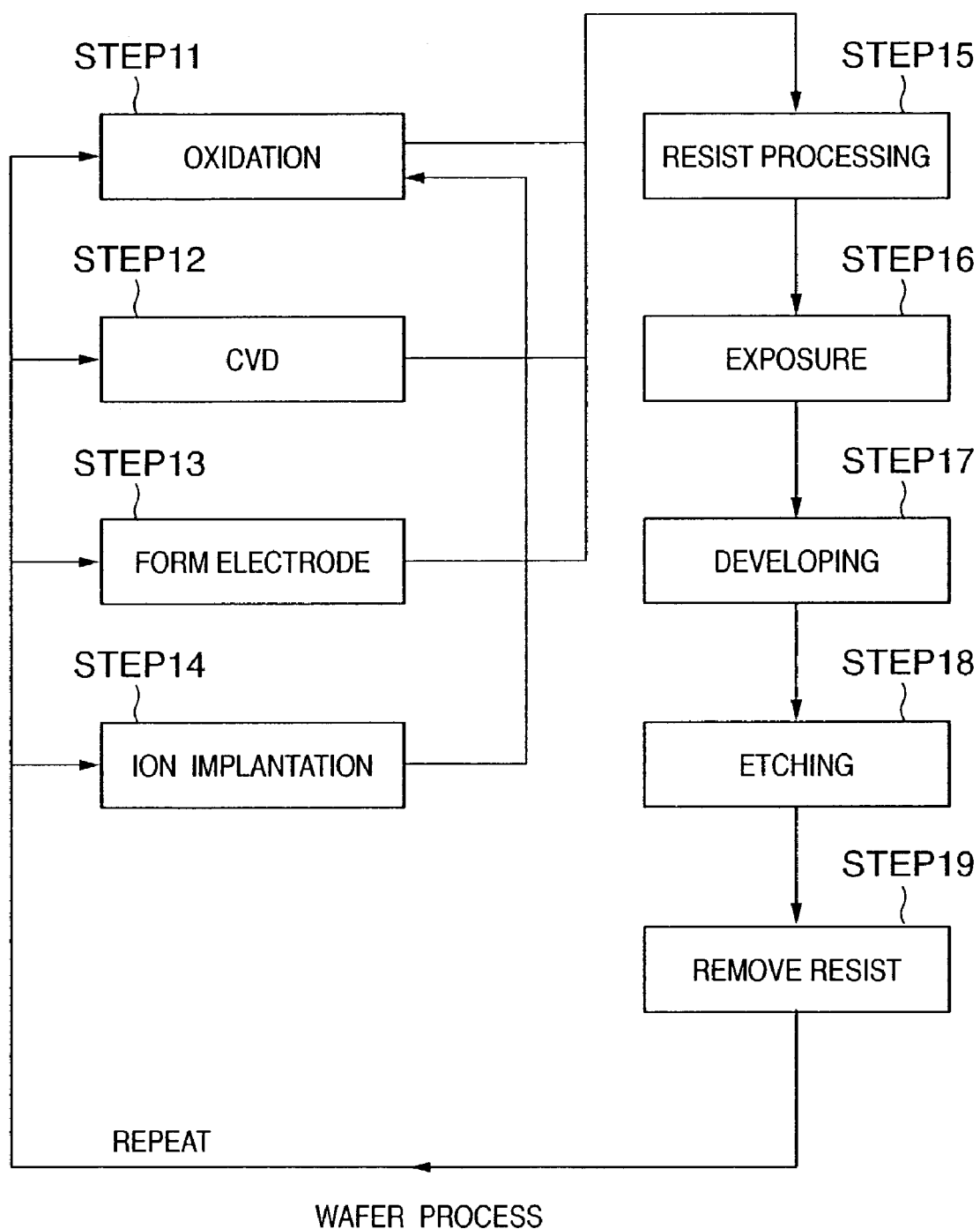
FIG. 8 is a flow chart showing the detailed flow of a wafer process.

FIG. 8 is a flow chart showing the detailed flow of the wafer process. In step 11 (oxidation), the wafer surface is oxidized. In step 12 (CVD), an insulating film is formed on the wafer surface. In step 13 (electrode formation), an electrode is formed on the wafer by vapor deposition. In step 14 (ion implantation), ions are implanted in the wafer. In step 15 (resist processing), a photosensitive agent is applied to the wafer. In step 16 (exposure), the exposure apparatus described in the second embodiment transfers a circuit pattern onto the wafer. In step 17 (developing), the exposed wafer is developed. In step 18 (etching), the resist is etched except for the developed resist image. In step 19 (resist removal), an unnecessary resist after etching is removed. These steps are repeated to form multiple circuit patterns on the wafer.

As described above, according to the above-described embodiments, even in a camera system having a plurality of cameras different in sync method due to different specifications, such as the number of pixels (e.g., the numbers of vertical and horizontal pixels), a set (one type) of camera sync signals is generated by one camera controller, and each camera is controlled in accordance with these signals. An image can, therefore, be captured before an output signal from a camera for use is stabilized.

A semiconductor manufacturing apparatus having a plurality of cameras for different purposes can shorten the camera switching time and increase the throughput as an index representing productivity. Enhancing the stability of the camera output signal results in a high measurement precision.

The present invention can shorten, e.g., the switching time between cameras having different specifications.

As many apparently widely different embodiments of the present invention can be made without departing from the spirit and scope thereof, it is to be understood that the invention is not limited to the specific embodiments thereof, except as defined in the claims.

What is claimed is:

1. An exposure apparatus for exposing a substrate to a pattern, said apparatus comprising:

a stage configured to hold the substrate and to move;

a driving unit configured to drive said stage;

a plurality of cameras, each of said plurality of cameras being configured to sense an image of a mark for alignment of the substrate, said plurality of cameras including at least two cameras of which specifications are different from each other;

a camera controller configured to supply a sync signal common to said plurality of cameras, to cause said plurality of cameras to execute image sensing based on the common sync signal, and to measure position of the mark based on the sensed image; and a drive controller configured to control said driving unit based on information provided by said camera controller, wherein the common sync signal includes a common horizontal sync signal having a first horizontal period, one of said at least two cameras includes an image sensing element having a specification in which the image sensing element operates in accordance with a horizontal sync signal having a second horizontal period, and said one camera drives the image sensing element in accordance with the common horizontal sync signal by using, as one horizontal period, a least common multiple of the first and second horizontal periods.

2. An exposure apparatus for exposing a substrate to a pattern, said apparatus comprising:

a stage configured to hold the substrate and to move;

a driving unit configured to drive said stage;

a plurality of cameras, each of said plurality of cameras being configured to sense an image of a mark for alignment of the substrate, said plurality of cameras including at least two cameras of which specifications are different from each other;

a camera controller configured to supply a sync signal common to said plurality of cameras, to cause said plurality of cameras to execute image sensing based on the common sync signal, and to measure position of the mark based on the sensed image; and a drive controller configured to control said driving unit based on information provided by said camera controller, wherein the common sync signal includes a common vertical sync signal having a first vertical period and a common horizontal sync signal having a first horizontal period, one of said at least two cameras includes an image sensing element having a specification in which the image sensing element operates in accordance with a vertical sync signal having a second vertical period longer than the first vertical period and a horizontal sync signal having a second horizontal period, and said one camera drives the image sensing element in accordance with the common vertical and horizontal sync signals by using, as one vertical period, a period which is longer than the second vertical period and is an integer multiple of the first vertical period and using, as one horizontal period, a least common multiple of the first and second horizontal periods.

* * * * *

UNITED STATES PATENT AND TRADEMARK OFFICE
CERTIFICATE OF CORRECTION

PATENT NO. : 7,154,537 B2
APPLICATION NO. : 10/330099
DATED : December 26, 2006
INVENTOR(S) : Hiroshi Tanaka It is certified that error appears in the above-identified patent and that said Letters Patent is hereby corrected as shown below:

COLUMN 4:
　　Line 9, "preferably" should read -- preferable --.
　　Line 11, "includes" should read -- include --.
　　Line 15, "drives" should read -- drive --.
　　Line 23, "includes" should read -- include --.
　　Line 27, "drives" should read -- drive --.
　　Line 35, "includes" should read -- include --.
　　Line 40 "drives" should read -- drive --.

COLUMN 6:
　　Line 39, "VDtnstd'=[int (VDtnstd/VDtstd)+1)×VDtstd" should read
--VDtnstd'=[int (VDtnstd/VDtstd)+1]×VDtstd --.

COLUMN 7:
　　Line 14, "VDtnstd'/VDtstd)" should read -- (VDtnstd'/VDtstd) --.

COLUMN 8:
　　Line 17, "frequency" should read -- frequencies -- and "clock" should read
-- clocks --.

Signed and Sealed this

Twenty-eighth Day of August, 2007

JON W. DUDAS
*Director of the United States Patent and Trademark Office*